(12) United States Patent
Yoshida et al.

(10) Patent No.: US 8,064,187 B2
(45) Date of Patent: Nov. 22, 2011

(54) MONOLITHIC CERAMIC ELECTRONIC COMPONENT

(75) Inventors: Akihiro Yoshida, Echizen (JP); Hiroyuki Matsumoto, Izumo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 374 days.

(21) Appl. No.: 12/494,537

(22) Filed: Jun. 30, 2009

(65) Prior Publication Data
US 2010/0002356 A1    Jan. 7, 2010

(30) Foreign Application Priority Data

Jul. 2, 2008 (JP) .................................. 2008-172931

(51) Int. Cl.
*H01G 4/30* (2006.01)
(52) U.S. Cl. ............... 361/301.4; 361/321.1; 361/321.2; 361/306.1; 361/306.3; 361/313
(58) Field of Classification Search ............... 361/301.4, 361/301.2, 308.1, 309, 311–313, 306.1, 306.3, 361/321.1, 321.2, 303–305
See application file for complete search history.

(56) References Cited

U.S. PATENT DOCUMENTS

| | | | |
|---|---|---|---|
| 6,563,689 B2* | 5/2003 | Yamamoto | 361/306.1 |
| 6,606,238 B1* | 8/2003 | Nakamura et al. | 361/321.2 |
| 6,927,966 B2* | 8/2005 | Miyazaki et al. | 361/321.2 |
| 6,934,145 B2* | 8/2005 | Hsieh et al. | 361/321.2 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,035,079 B1* | 4/2006 | Park et al. | 361/303 |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,292,430 B2* | 11/2007 | Lee et al. | 361/306.3 |
| 7,324,324 B2* | 1/2008 | Sugimoto et al. | 361/303 |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,602,601 B2* | 10/2009 | Togashi | 361/306.3 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |

(Continued)

FOREIGN PATENT DOCUMENTS

| | | |
|---|---|---|
| JP | 09-129476 A | 5/1997 |
| JP | 2004-327983 A | 11/2004 |

OTHER PUBLICATIONS

Sasaki, "Electronic Component", U.S. Appl. No. 13/187,678, filed Jul. 21, 2011.

(Continued)

*Primary Examiner* — Nguyen T Ha
(74) *Attorney, Agent, or Firm* — Keating & Bennett, LLP

(57) ABSTRACT

A monolithic ceramic electronic component includes a dummy electrode having a dummy body portion and an internal electrode having an extended portion, in which the conductor density of the dummy body portion is less than the conductor density of the extended portion of an internal electrode. With this configuration, the fixing strength of an external terminal electrode to a ceramic element assembly is improved, and undesirable deformation caused by a dummy conductor provided in a monolithic ceramic electronic component is prevented.

10 Claims, 18 Drawing Sheets

U.S. PATENT DOCUMENTS

| | | |
|---|---|---|
| 2008/0123249 A1 | 5/2008 | Kunishi et al. |
| 2008/0145551 A1 | 6/2008 | Kunishi et al. |
| 2008/0151470 A1 | 6/2008 | Motoki et al. |
| 2008/0158774 A1 | 7/2008 | Trinh |
| 2008/0210564 A1 | 9/2008 | Motoki et al. |
| 2008/0225462 A1 | 9/2008 | Motoki et al. |
| 2008/0239617 A1 | 10/2008 | Motoki et al. |
| 2009/0052114 A1 | 2/2009 | Motoki et al. |

OTHER PUBLICATIONS

Iwanaga et al., "Laminated Ceramic Electronic Component and Manufacturing Method Therefor", U.S. Appl. No. 13/189,636, filed Jul. 25, 2011.

Taniguchi et al.; "Multilayer Ceramic Electronic Component and Manufacturing Method Thereof"; U.S. Appl. No. 12/485,360, filed Jun. 16, 2009.

* cited by examiner

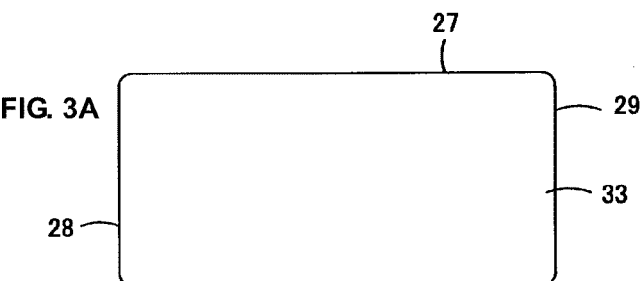
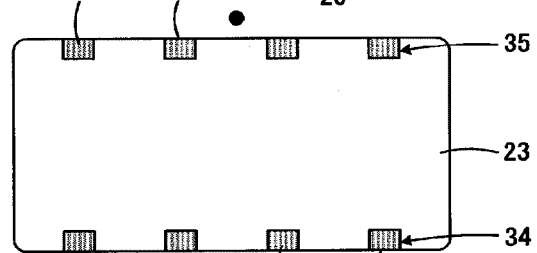
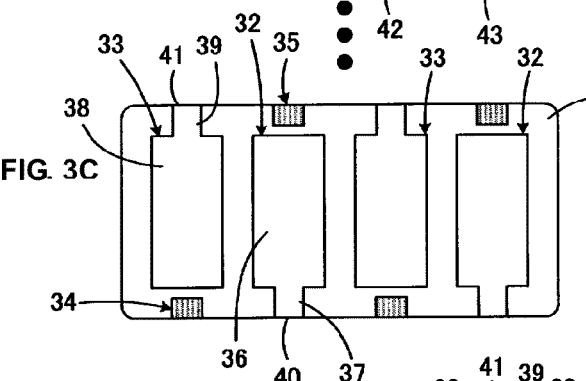
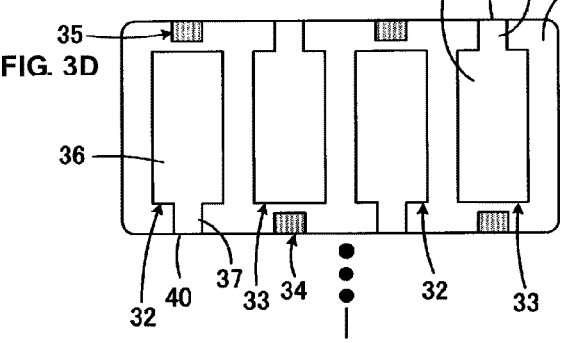
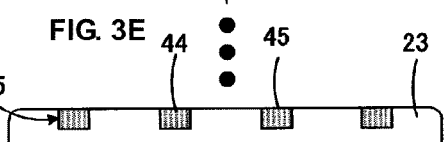
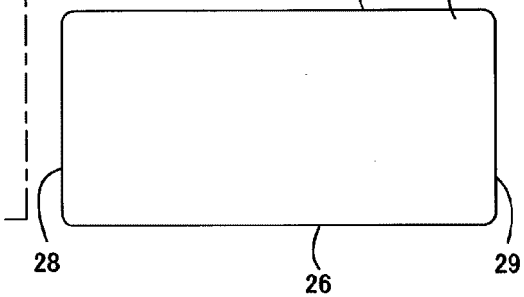

MONOLITHIC CERAMIC ELECTRONIC COMPONENT

BACKGROUND OF THE PRESENT INVENTION

1. Field of the Invention

The present invention relates to a monolithic ceramic electronic component and, more particularly, to a monolithic ceramic electronic component in which an external terminal electrode is not only connected to exposed ends of internal electrodes but also connected to exposed ends of dummy conductors to thereby improve the fixing strength of the external terminal electrode.

2. Description of the Related Art

In recent years, miniaturization of electronic apparatuses, such as a cellular phone, a notebook computer, a digital still camera and a digital audio instrument, has progressed, and these electronic apparatuses use a large number of monolithic ceramic electronic components that enable miniaturization and provide high performance.

Generally, each monolithic ceramic electronic component includes a ceramic element assembly, internal electrodes, and external terminal electrodes. The ceramic element assembly includes a plurality of laminated ceramic layers. The internal electrodes are provided inside the ceramic element assembly. The external terminal electrodes are disposed on the outer surface of the ceramic element assembly. Then, the monolithic ceramic electronic component is arranged on a conductive land of a mounting substrate, and is mounted on the substrate through a conductive bonding material, such as solder.

The monolithic ceramic electronic component mounted on the substrate may undergo external tensile stress. The tensile stress is caused by warping of the substrate or thermal expansion and contraction of the substrate due to changes in external temperature. If the monolithic ceramic electronic component undergoes such stress, the external terminal electrodes may peel off from the ceramic element assembly to cause a so-called open mode failure.

To prevent such an open mode failure, it is a technical challenge to improve the fixing strength of the external terminal electrodes to the ceramic element assembly. For example, Japanese Unexamined Patent Application Publication No. 9-129476 discloses a method to improve the fixing strength. Dummy conductors, which are internal conductors that do not substantially contribute to electrical characteristics, are provided inside the ceramic element assembly, and then metallic bonds between the external terminal electrodes and the dummy conductors are utilized to improve the fixing strength of the external terminal electrodes.

On the other hand, there is a need for further miniaturizing the monolithic ceramic electronic component. When the monolithic ceramic electronic component is miniaturized, an effective area in which the internal electrodes face each other is reduced. Thus, the characteristics tend to decrease. In addition, in a multiterminal monolithic ceramic electronic component, it is necessary to provide a plurality of external terminal electrodes at a narrow pitch. However, an existing method of baking a thick-film paste limits the accuracy of paste coating, and it is difficult to accurately form the external terminal electrodes.

For this reason, a method of directly forming external terminal electrodes by plating has been disclosed. With the above method, thin flat external terminal electrodes may be formed and, as a result, it is possible to increase the effective areas of the internal electrodes. In addition, plating is deposited at the exposed ends of the internal electrodes, such that it is possible to accurately form the external terminal electrodes even at a narrow pitch.

For example, Japanese Unexamined Patent Application Publication No. 2004-327983 discloses that the dummy conductors are also used when the external terminal electrodes are directly formed by plating as described above. Thus, plating metal may be not only deposited at the exposed ends of the internal electrodes but also deposited at the exposed ends of the dummy conductors. This makes it possible to further reliably deposit plating.

In the monolithic ceramic electronic component, it has been determined that forming the dummy conductors inside the ceramic element assembly is a useful technique.

When a monolithic ceramic electronic component including dummy conductors is prepared, internal electrode patterns and dummy conductor patterns are printed on ceramic green sheets. Then, the ceramic green sheets are laminated and sequentially pressure-bonded, and the obtained mother block is stamped.

However, as viewed in a direction in which the ceramic layers are laminated, the internal electrode patterns and the dummy conductor patterns are arranged in an overlapping manner. Thus, the density of the electrode patterns is increased at the overlapping portions. For this reason, the flowability of the ceramic green sheets is inhibited when the mother block is stamped. This may cause a swell (waviness) of the ceramic green sheets in the stamped mother block. Depending on the situation, there is a possibility that the reliability may decrease because of a structural defect, such as delamination.

FIG. 16 shows a partially enlarged cross-sectional view of a monolithic ceramic electronic component 1 that has a deformation due to the above-described swell (waviness).

As shown in FIG. 16, the monolithic ceramic electronic component 1 includes a ceramic element assembly 3 including a plurality of laminated ceramic layers 2. Inside the ceramic element assembly 3, first and second internal electrodes 4 and 5 are alternately arranged in a laminated direction. Ends of the first internal electrodes 4 are exposed at a first side surface 6 of the ceramic element assembly 3. Although not shown in FIG. 16, ends of the second internal electrodes 5 are exposed at a second side surface opposite the first side surface 6 of the ceramic element assembly 3.

In addition, a plurality of first dummy conductors 7 are provided inside the ceramic element assembly 3 so that the first dummy conductors 7 are electrically insulated from the internal electrodes 4 and 5. The ends of the first dummy conductors 7 shown in FIG. 16 are exposed to the first side surface 6 of the ceramic element assembly 3. Although not shown in FIG. 16, second dummy conductors are also provided so that the ends of the second dummy conductors are exposed to the second side surface of the ceramic element assembly 3.

In addition, a first external terminal electrode 8 is disposed on the first side surface 6. The first external terminal electrode 8 is arranged so as to cover the ends of the first internal electrodes 4 and the ends of the dummy conductors 7. Although not shown in the drawing, a second external terminal electrode is disposed on the second side surface of the ceramic element assembly 3.

When stamping a mother block that is prepared to manufacture the monolithic ceramic electronic component 1, if described with reference to a portion shown in FIG. 16, patterns that define the internal electrodes 4 and patterns that define the dummy conductors 7 are arranged in overlapping locations as viewed in the direction in which the ceramic layers 2 are laminated. Thus, as described above, flowability of the ceramic green sheets is inhibited. This easily causes a swell (waviness) of the ceramic green sheets in the stamped mother block. Thus, the deformation as shown in the FIG. 16 occurs.

In addition, as shown in FIG. 17, a process of laminating and sequentially pressure-bonding ceramic green sheets is performed by repeatedly transporting a ceramic green sheet 10 onto a stamping base 11 by a stamping head 9 and laminating and pressure-bonding the ceramic green sheets 10 on the stamping base 11. Here, the plurality of ceramic green sheets 10 that define the desired mother block undergo repeated lamination and pressure-bonding from the bottom, and the initially laminated ceramic green sheets 10 and the conductive patterns, such as the internal electrode patterns and the dummy conductor patterns, undergo a load of pressure-bonding many times. Then, particularly, a pressure concentrates on a portion of the conductive patterns having a high density. In the obtained mother block, a phenomenon occurs in that the conductive patterns at the lower principal surface side, at which the initially laminated ceramic green sheets 10 are located, are expanded by a larger amount than those at the upper principal surface side.

This problem is particularly significant when the external terminal electrodes are formed directly by plating. That is, as the conductive patterns at the lower principal surface side expand, the width of each of the exposed ends of the internal electrodes and dummy conductors differs between the upper principal surface side of the ceramic element assembly and the lower principal surface side of the ceramic element assembly. Then, because of this exposed state, there is a problem in that the external terminal electrodes 12 each have a substantially trapezoidal shape as shown in FIG. 18. FIG. 18 shows a side surface 14 of the ceramic element assembly 13, on which the striped external terminal electrodes 12 are formed in a plurality of lines.

As described above, when the external terminal electrodes 12 each have a substantially trapezoidal shape, it causes, for example, a tombstone defect or a self-alignment defect due to vertical directivity or increases the likelihood that a solder bridge may occur due to close location of the lower portions of the adjacent substantially trapezoidal shapes.

SUMMARY OF THE PRESENT INVENTION

To overcome the problems described above, preferred embodiments of the present invention provide a reliable monolithic ceramic electronic component in which waviness of the ceramic green sheets is prevented.

According to a preferred embodiment of the present invention, a monolithic ceramic electronic component includes a ceramic element assembly including a plurality of laminated ceramic layers, a first principal surface and a second principal surface that are opposed to each other and a plurality of side surfaces connecting the first principal surface with the second principal surface, a first internal electrode that is provided inside the ceramic element assembly and that includes a first effective portion, a first extended portion extending from the first effective portion to at least one of the side surfaces, and a first electrode exposed end located at a terminal end of the first extended portion and exposed on the at least one of the side surfaces, a second internal electrode that is provided inside the ceramic element assembly and that includes a second effective portion opposite the first effective portion through one of the ceramic layers, a second extended portion extending from the second effective portion to at least one of the side surfaces, and a second electrode exposed end located at a terminal end of the second extended portion and exposed on the at least one of the side surfaces, a first dummy conductor that is provided inside the ceramic element assembly and that includes a first dummy body portion and a first dummy exposed end located at a terminal end of the first dummy body portion and exposed on at least one of the side surfaces, wherein the first dummy conductor is electrically insulated from the second internal electrode, a second dummy conductor that is provided inside the ceramic element assembly and that includes a second dummy body portion and a second dummy exposed end located at a terminal end of the second dummy body portion and exposed on at least one of the side surfaces, wherein the second dummy conductor is electrically insulated from the first internal electrode, a first external terminal electrode that is provided on at least one of the side surfaces of the ceramic element assembly, and a second external terminal electrode that is provided on at least one of the side surfaces of the ceramic element assembly.

The first electrode exposed end and the first dummy exposed end define a first exposed end distribution region that extends in at least one line in a direction in which the ceramic layers are laminated on at least one of the side surfaces. The second electrode exposed end and the second dummy exposed end define a second exposed end distribution region that extends in at least one line in the direction in which the ceramic layers are laminated on at least one of the side surfaces.

The first external terminal electrode is arranged so as to cover the first exposed end distribution region, and the second external terminal electrode is arranged so as to cover the second exposed end distribution region.

In this preferred embodiment of the present invention, the conductor density of the first dummy body portion is less than the conductor density of the first extended portion, and the conductor density of the second dummy body portion is less than the conductor density of the second extended portion.

Note that the dummy conductors usually do not substantially contribute to the electrical characteristics. However, it may unexpectedly influence the electrical characteristic.

Preferably, the first external terminal electrode includes a first base plating film that is directly formed by plating so as to cover the first exposed end distribution region, and the second external terminal electrode includes a second base plating film that is directly formed by plating so as to cover the second exposed end distribution region.

Preferably, the first dummy conductor may be arranged substantially in the same plane as the second internal electrode and the second dummy conductor may be arranged substantially in the same plane as the first internal electrode, or the first dummy conductor and the second dummy conductor may be arranged substantially in the same plane.

In addition, the ceramic element assembly may preferably include outer layer portions at a side adjacent to the first principal surface and at a side adjacent to the second principal surface, neither the first internal electrode nor the second internal electrode may be provided in the outer layer portions, and the first dummy conductor and the second dummy conductor may be provided at the outer layer portions.

The plurality of side surfaces may preferably include a first side surface and a second side surface that are opposed to each other, the first exposed end distribution region may be arranged on the first side surface, and the second exposed end distribution region may be arranged on the second side surface.

The plurality of side surfaces may preferably include a first side surface and a second side surface that are opposed to each other and a third side surface and a fourth side surface that are opposed to each other, the first exposed end distribution region may preferably be arranged on the first side surface, the third side surface and the fourth side surface, and the second exposed end distribution region may preferably be arranged on the second side surface, the third side surface and the fourth side surface.

In addition, a plurality of lines of the first exposed end distribution regions may preferably be arranged on at least one of the side surfaces in a width direction of the at least one of the side surfaces, and a plurality of lines of the second exposed end distribution regions may preferably be arranged on at least one of the side surfaces in a width direction of the at least one of the side surfaces.

In order to decrease the conductor density, a plurality of spaced apart substantially linear or reticular conductors may preferably be arranged to extend in the first dummy body portion and the second dummy body portion.

According to preferred embodiments of the present invention, by decreasing the conductor density of the dummy body portion of each of the first and second dummy conductors, ceramic green sheets easily flow toward dummy conductor patterns during stamping which prevents the waviness of the ceramic green sheets. That is, the problem described with reference to FIG. 16 is much less likely to occur. Thus, a reliable monolithic ceramic electronic component can be provided.

In addition, during lamination and sequential pressure-bonding, internal electrode patterns easily flow toward the central portions because of a pressure applied to a portion at which the extended portions of the internal electrodes overlap the dummy body portions of the dummy conductors. Thus, it is possible to further equalize the widths of the exposed ends of the internal electrodes and dummy conductors between one principal surface side and the other principal surface side of the ceramic element assembly. Thus, particularly, when the external terminal electrodes are formed directly by plating, it is possible to form external terminal electrodes having straight edge portions, thus making it possible to prevent that may occur at the time of mounting. That is, the problem described with reference to FIG. 17 and FIG. 18 is much less likely to occur.

Other features, elements, steps, characteristics and advantages of the present invention will become more apparent from the following detailed description of preferred embodiments of the present invention (with reference to the attached drawings).

BRIEF DESCRIPTION OF THE DRAWINGS

FIG. 3A to FIG. 3F are plan views showing the internal structure of a ceramic element assembly included in the monolithic ceramic electronic component shown in FIG. 1.

DETAILED DESCRIPTION OF PREFERRED EMBODIMENTS

Figure 1:
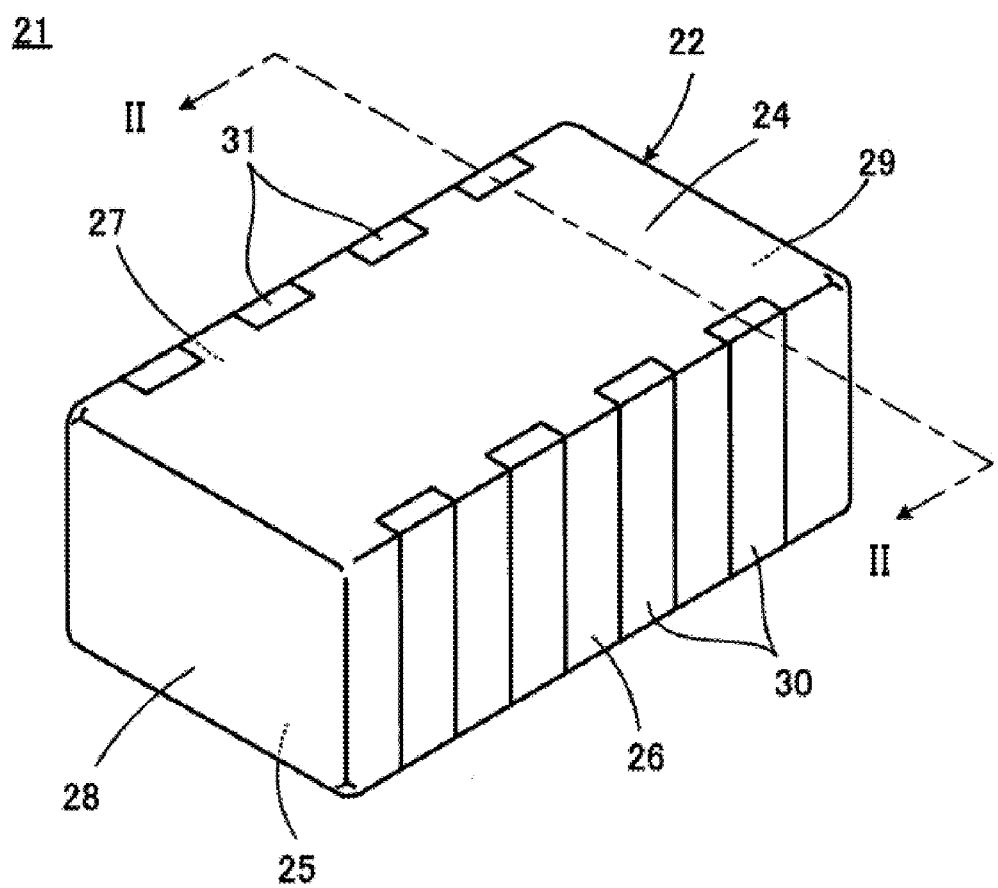
FIG. 1 is a perspective view showing a monolithic ceramic electronic component according to a first preferred embodiment of the present invention.
Figure 2:
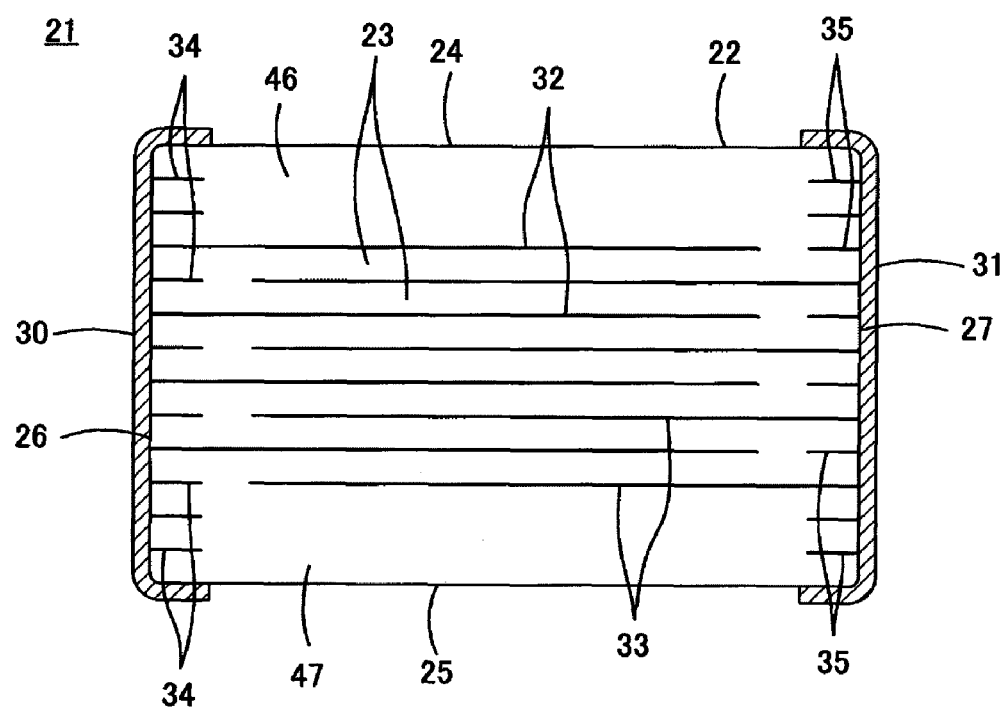
FIG. 2 is a cross-sectional view taken along the line II-II in FIG. 1.

FIG. 1 to FIG. 9 illustrate a monolithic ceramic electronic component 21 according to a first preferred embodiment of the present invention. FIG. 1 is a perspective view showing the monolithic ceramic electronic component 21. FIG. 2 is a cross-sectional view taken along the line II-II in FIG. 1. FIG. 3A to FIG. 3F are plan views showing the internal structure of a ceramic element assembly 22 included in the monolithic ceramic electronic component 21 shown in FIG. 1, and showing typical configurations in cross section.

As shown in FIG. 1 to FIG. 3F, the ceramic element assembly 22 of the monolithic ceramic electronic component 21 includes a plurality of laminated ceramic layers 23. The ceramic element assembly 22 has a first principal surface 24 and a second principal surface 25 that are opposite to each other, and first to fourth side surfaces 26 to 29 that connect the first principal surface 24 with the second principal surface 25. The first side surface 26 and the second side surface 27 are opposite to each other. The third side surface 28 and the fourth side surface 29 are opposite each other. Note that the sequence of FIG. 3A to FIG. 3F shows the order in which the plurality of ceramic layers 23 are laminated.

As shown in FIG. 1, the monolithic ceramic electronic component 21 preferably has an array structure, for example. A plurality of first external terminal electrodes 30 are provided on the first side surface 26. A plurality of second external terminal electrodes 31 are provided on the second side surface 27. The first external terminal electrodes 30 and the second external terminal electrodes 31 are electrically insulated from each other.

As shown in FIG. 2 and FIG. 3A to FIG. 3F, first and second internal electrodes 32 and 33 and first and second dummy conductors 34 and 35 are arranged inside the ceramic element assembly 22. The first internal electrodes 32 and the first dummy conductors 34 extend to the first side surface 26, and are electrically connected to the first external terminal electrodes 30. The second internal electrodes 33 and the second dummy conductors 35 extend to the second side surface 27, and are electrically connected to the second external terminal electrodes 31.

As shown in FIG. 3C and FIG. 3D, each of the first internal electrodes 32 includes a first effective portion 36 and a first extended portion 37 that extends from the first effective portion 36 to the first side surface 26. Each of the second internal electrodes 33 includes a second effective portion 38 and a second extended portion 39 that extends from the second effective portion 38 to the second side surface 27. The width of the first extended portion 37 is less than the width of the first effective portion 36. The width of the second extended portion 39 is less than the width of the second effective portion 38.

A predetermined electrical characteristic is produced at each portion at which the first effective portion 36 is opposed to the second effective portion 38 through the ceramic layer 23.

A first electrode exposed end 40 exposed at the first side surface 26 is located at a terminal end of each first extended portion 37. A second electrode exposed end 41 exposed at the second side surface 27 is arranged at a terminal end of each second extended portion 39. The first and second electrode exposed ends 40 and 41 respectively define connecting portions with the first and second external terminal electrodes 30 and 31.

The first and second internal electrodes 32 and 33 are preferably alternately arranged in substantially the same plane, for example. With this arrangement, one of the first and second extended portions 37 and 39 is not arranged unevenly to one of the first and second side surfaces 26 and 27 substantially in a specific plane, and a balance of the connecting portions between the adjacent ceramic layers 23 may be maintained. Thus, it is possible to improve the reliability of the monolithic ceramic electronic component 21.

Each of the first dummy conductors 34 is electrically insulated from the second internal electrode 33 and preferably arranged substantially in the same plane as the second internal electrode 33. Each of the second dummy conductors 35 is electrically insulated from the first internal electrode 32 and preferably arranged substantially in the same plane as the first internal electrode 32.

Each of the first dummy conductors 34 includes a first dummy body portion 42 and a first dummy exposed end 43 that is arranged at a terminal end of the first dummy body portion 42 and exposed at the first side surface 26. Each of the first dummy exposed ends 43 defines a connecting portion with the first external terminal electrode 30. Each of the second dummy conductors 35 includes a second dummy body portion 44 and a second dummy exposed end 45 that is arranged at a terminal end of the second dummy body portion 44 and exposed at the second side surface 27. Each second dummy exposed end 45 defines a connecting portion with the second external terminal electrode 31.

The width of the first dummy body portion 42 is preferably equal or substantially equal to the width of the second extended portion 39, for example. The width of the second dummy body portion 44 is preferably equal or substantially equal to the width of the first extended portion 37, for example. In addition, when viewed in a direction connecting the first side surface 26 with the second side surface 27, the median line of the first dummy body portion 42 is preferably substantially aligned with the median line of the second extended portion 39, and the median line of the second dummy body portion 44 is preferably substantially aligned with the median line of the first extended portion 37. Thus, when the internal electrodes 32 and 33 and the dummy conductors 34 and 35 are printed on ceramic green sheets, an efficient manufacturing process can be utilized in which the internal electrodes 32 and 33 and the dummy conductors 34 and 35 are integrally formed as a continuous pattern and then the mother block is cut to divide the patterns to be separated into the internal electrodes 32 and 33 and the dummy conductors 34 and 35.

In this preferred embodiment, the first and second dummy conductors 34 and 35 are preferably arranged substantially in the same plane. In addition, the first and second dummy conductors 34 and 35 are also provided in outer layer portions 46 and 47. The outer layer portions 46 and 47 are respectively arranged at the first principal surface 24 side of the ceramic element assembly 22 and at the second principal surface 25 side of the ceramic element assembly 22, and no first internal electrode 32 or second internal electrode 33 is provided in the outer layer portions 46 and 47.

Figure 4:
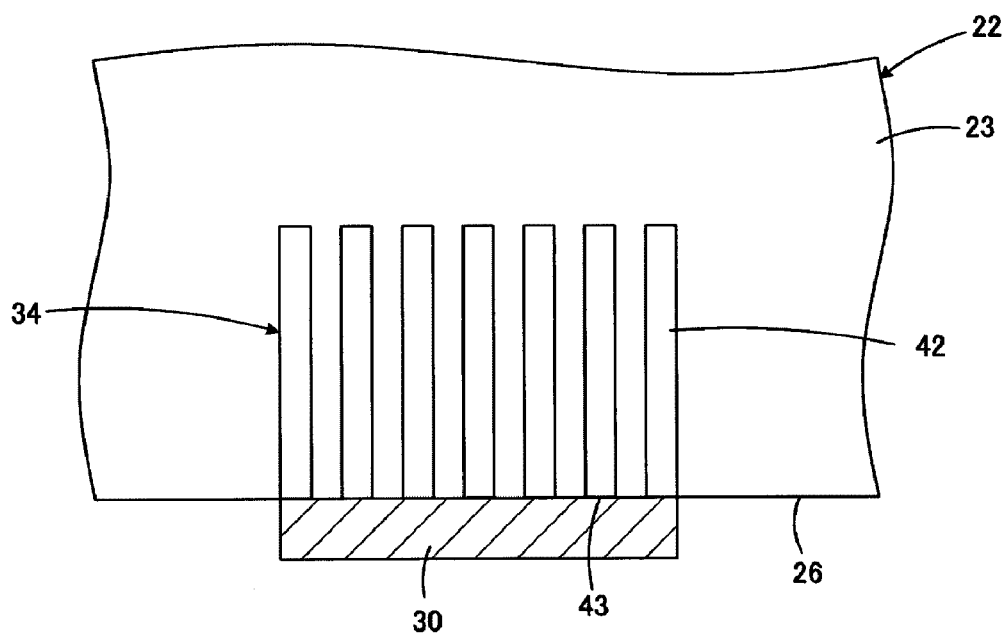
FIG. 4 is an enlarged plan view showing a first dummy conductor shown in FIG. 3 together with a first external terminal electrode.

FIG. 4 is an enlarged plan view showing the first dummy conductor 34.

As shown in FIG. 4, a plurality of linear conductors are provided in the first dummy body portion 42 of the first dummy conductor 34 so that the linear conductors are spaced apart from each other and extend perpendicularly or substantially perpendicular to the first side surface 26. Thus, the conductor density of the first dummy body portion 42 is less than the conductor density of the first extended portion 37. Although not shown in detail, the same is applied to the second dummy conductor 35. In the first and second dummy body portions 42 and 44, the percentage of conductor area is preferably about 30% to about 70%, for example. Note that the first and second extended portions 37 and 39 define current paths to extract electrical characteristics, so the conductor density preferably is relatively high.

The patterns of the dummy body portions 42 and 44 of which the conductor density should be relatively low may be variously changed as will be described with reference to FIG. 5 to FIG. 8. FIG. 5 to FIG. 8 are views that correspond to FIG. 4. Hereinafter, the first dummy body portion 42 will be described.

Figure 5:
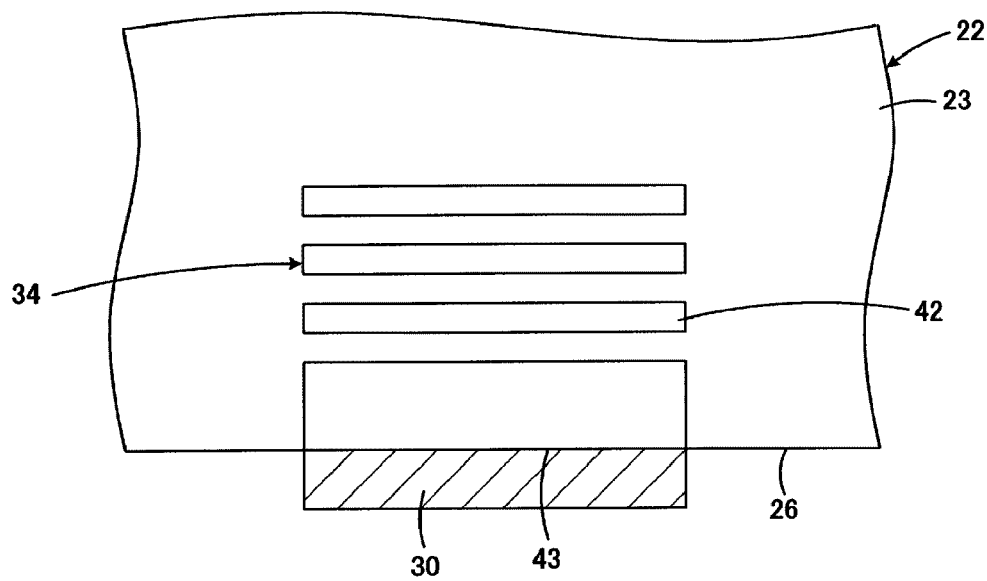
FIG. 5 is a view corresponding to FIG. 4, showing a first alternative preferred embodiment of the first dummy conductor according to the present invention.

In FIG. 5, the first dummy body portion 42 includes a plurality of linear conductors that extend and are spaced apart from each other. The linear conductors extend parallel or substantially parallel to the first side surface 26. In this case, the first dummy exposed end 43 is preferably continuous. Thus, particularly, when the external terminal electrode 30 is directly formed by plating, it is possible to increase the area of a core portion at which plating is deposited. In addition, in order to prevent a gap portion between the adjacent conductors from being erroneously exposed, the width of the line at the exposed end 43 side is preferably increased.

Figure 6:
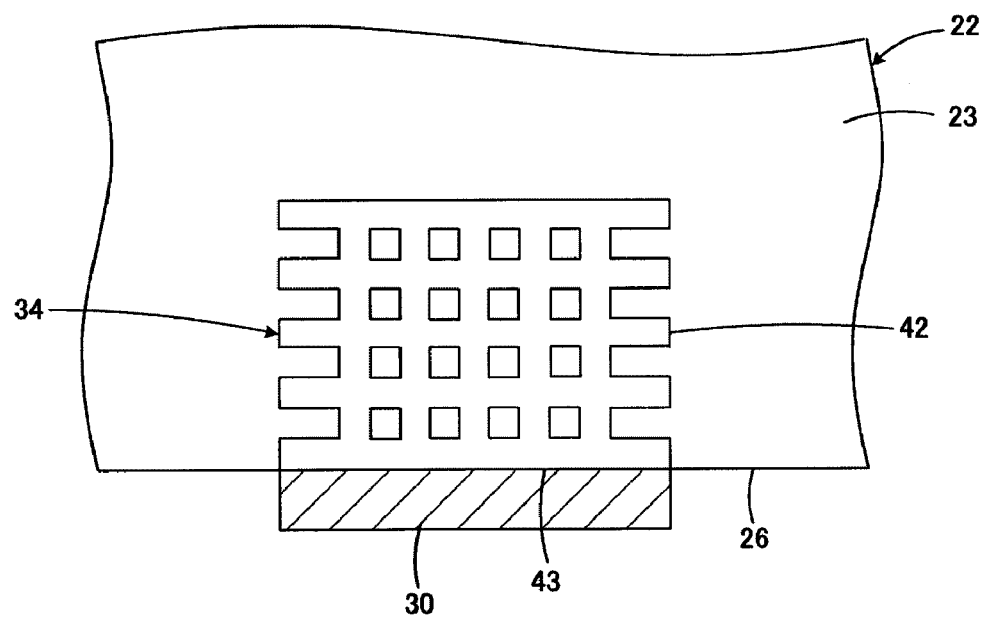
FIG. 6 is a view corresponding to FIG. 4, showing a second alternative preferred embodiment of the first dummy conductor according to the present invention.
Figure 7:
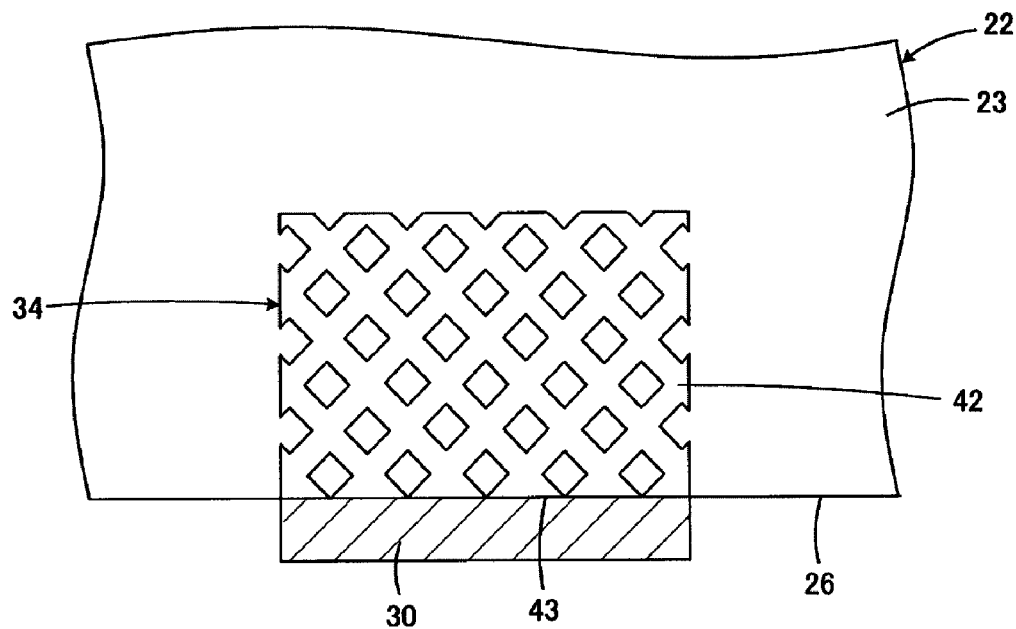
FIG. 7 is a view corresponding to FIG. 4, showing a third alternative preferred embodiment of the first dummy conductor according to the present invention.

In both FIG. 6 and FIG. 7, the first dummy body portion 42 is defined by a reticular conductor. Particularly, when the dummy conductors 34 are provided at the outer layer portions 46 and 47, the dummy conductors 34 may preferably improve the strength of the ceramic element assembly 22. Thus, the dummy body portion 42 shown in FIG. 6 or FIG. 7 is effective.

Figure 8:
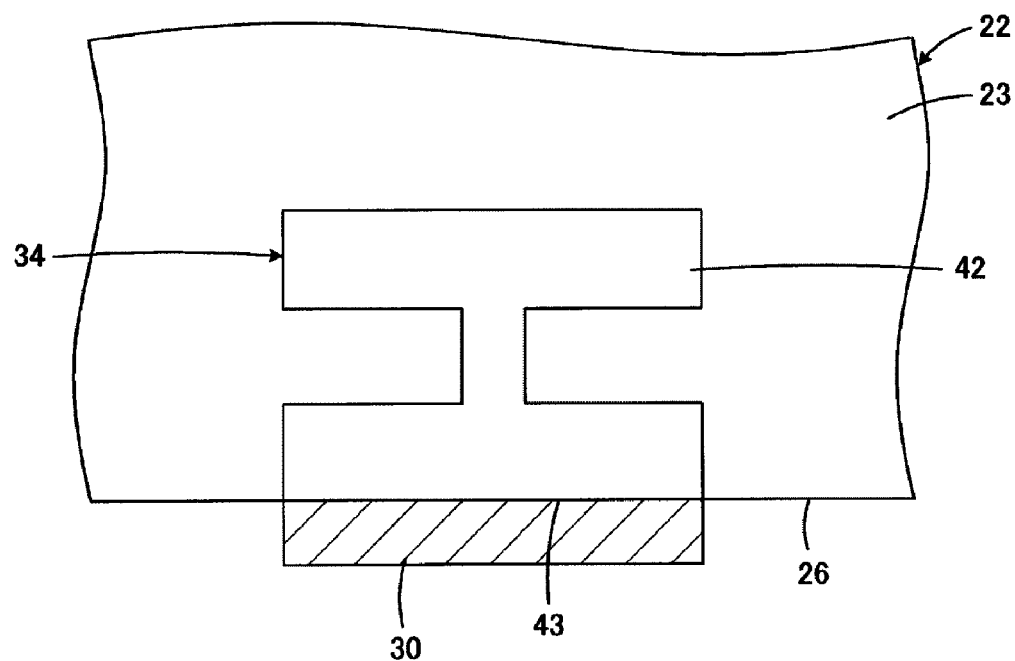
FIG. 8 is a view corresponding to FIG. 4, showing a fourth alternative preferred embodiment of the first dummy conductor according to the present invention.

In FIG. 8, the first dummy body portion 42 has a configuration in which a conductor arranged vertical or substantially vertical to the first side surface 26 and conductors arranged parallel or substantially parallel to the first side surface 26 are combined.

Figure 9:
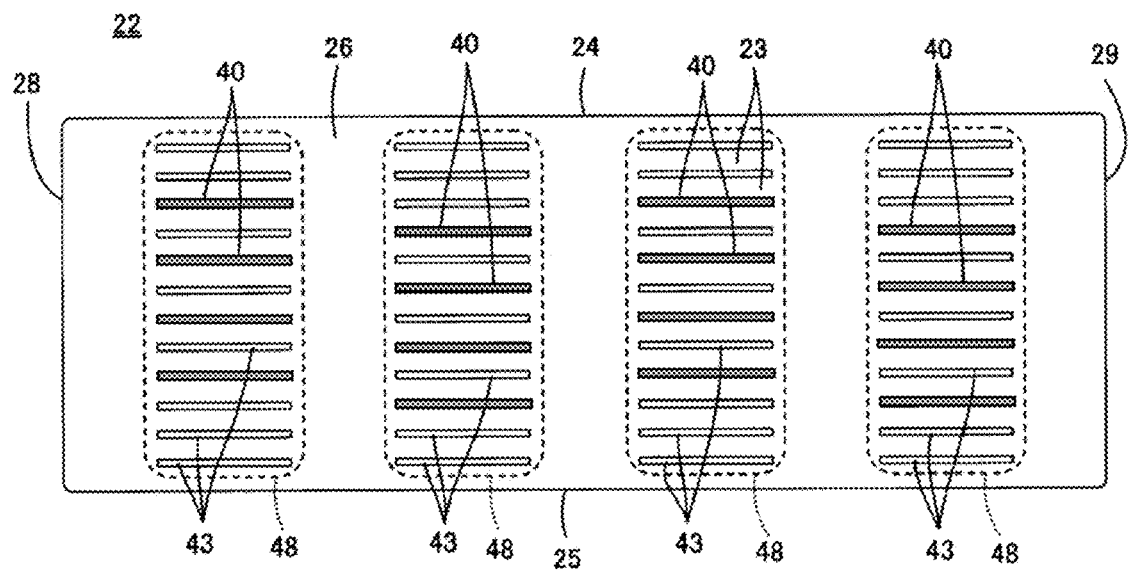
FIG. 9 is a view showing a first side surface of the ceramic element assembly in a stage prior to forming the external terminal electrodes in the monolithic ceramic electronic component shown in FIG. 1.

FIG. 9 is a view showing the first side surface 26 of the ceramic element assembly 22 in a stage prior to forming the external terminal electrodes 30 and 31. In FIG. 9, the first electrode exposed ends 40 and the first dummy exposed ends 43 are shown. In the drawing, to distinguish these exposed ends 40 and 43, the electrode exposed ends 40 are indicated by gray rectangles, and the dummy exposed ends 43 are indicated by outlined rectangles.

As shown in FIG. 3A to FIG. 3F, when projecting the ceramic element assembly 22 in a direction in which the ceramic layers 23 are laminated, the first extended portions 37 and the first dummy body portions 42 are preferably arranged so as to overlap each other, and the second extended portions 39 and the second dummy body portions 44 are preferably arranged so as to overlap each other.

Thus, as shown in FIG. 9, the first electrode exposed ends 40 and the first dummy exposed ends 43 preferably define first exposed end distribution regions 48 that respectively extend on the first side surface 26 in a plurality of lines in the direction in which the ceramic layers 23 are laminated. Each first exposed end distribution region 48 is preferably covered with the first external terminal electrode 30. The width of the first electrode exposed end 40 is preferably substantially equal to the width of the first dummy exposed end 43, for example.

Although not shown in the drawing, similarly, the second electrode exposed ends 41 and the second dummy exposed ends 45 preferably define second exposed end distribution regions on the second side surface 27, and each of the second exposed end distribution regions is preferably covered with the second external terminal electrode 31.

Note that in one exposed end distribution region, the number of dummy conductors arranged at one of the outer layer portions is about 1 to about 30, for example.

The material that defines each ceramic layer 23 may preferably include, for example, dielectric ceramics that contain $BaTiO_3$, $CaTiO_3$, $SrTiO_3$ or $CaZrO_3$ as a main component. In addition, any one of these main components with an additive accessory component, such as a Mn compound, a Fe compound, a Cr compound, a Co compound, and a Ni compound, for example may also be used. Other than that, piezoelectric ceramics, such as PZT ceramics, and semiconductor ceramics, such as spinel ceramics, for example, may also be used.

When dielectric ceramics are used as the material that defines the ceramic layer 23, the monolithic ceramic electronic component 21 functions as a capacitor. When piezoelectric ceramics are used, the monolithic ceramic electronic component 21 functions as a piezoelectric component. When semiconductor ceramics are used, the monolithic ceramic electronic component 21 functions as a thermistor. The thickness of the fired ceramic layer 23 is preferably about 0.1 µm to about 10 µm, for example.

The conductive material included in the internal electrodes 32 and 33 or the dummy conductors 34 and 35 may preferably include, for example, Ni, Cu, Ag, Pd or Au or an alloy including any one of these elements. The conductive material included in the internal electrodes 32 and 33 and the conductive material included in the dummy conductors 34 and 35 are preferably made of the same metal, for example. The thickness of each of the fired internal electrodes 32 and 33 and the fired dummy conductors 34 and 35 is preferably about 0.1 µm to about 2.0 µm, for example. Preferably, the thickness of each of the fired dummy conductors 34 and 35 is about 1.0 µm or below, for example.

Each of the external terminal electrodes 30 and 31 preferably includes a base conductor film that covers the exposed end distribution region 48 and an upper layer plating film provided on the base conductor film. The base conductor film may be defined by a thick conductor film including a glass component. However, the base conductor film is preferably directly formed by plating.

The base conductor film is preferably made of, for example, one metal selected from the group consisting of Cu, Ni, Sn, Pb, Au, Ag, Pd, Bi and Zn or an alloy including the metal.

For example, when the internal electrodes 32 and 33 and the dummy conductors 34 and 35 are made of Ni, the base plating film is preferably made of Cu that is favorably bonded with Ni. In addition, when the upper layer plating film includes multiple layers, a metal that defines a base first layer is preferably Ni having a solder barrier property, for example, and a metal that defines an outer surface second layer is preferably made of Sn or Au, for example having a high solder wettability.

The thickness of each base plating film or each upper layer plating film is preferably about 1 µm to about 15 µm, for example.

Next, an example of a method of manufacturing the above described monolithic ceramic electronic component 21 will be described.

First, ceramic green sheets that define the ceramic layers 23, a conductive paste for the internal electrodes 32 and 33 and a conductive paste for the dummy conductors 34 and 35 are prepared. These ceramic green sheets and conductive pastes preferably include binder and solvent. These binder and solvent may be known organic binder and known organic solvent, for example.

Subsequently, the conductive paste is printed on each of the ceramic green sheets in a predetermined pattern by, for example, screen printing, or other suitable method. Thus, the ceramic green sheets on which both the conductive paste films that respectively define the internal electrodes 32 and 33 and the conductive paste films that respectively define the dummy conductors 34 and 35 are obtained, and the ceramic green sheets on which the conductive paste films that respectively define the dummy conductors 34 and 35 are obtained.

After that, a predetermined number of the ceramic green sheets, on which both the conductive paste films that define the internal electrodes 32 and 33 and the conductive paste films that define the dummy conductors 34 and 35 as described above, are laminated in a predetermined order, and a predetermined number of outer layer ceramic green sheets are laminated on upper and lower sides of the laminated ceramic green sheets. Thus, a raw mother laminated body is obtained. The outer layer ceramic green sheets also include ones on which the conductive paste films that define the dummy conductors 34 and 35 are formed. The mother laminated body is, where necessary, pressure-bonded in the laminated direction by isostatic pressing, for example.

Then, the raw mother laminated body is cut to a predetermined size to produce the ceramic element assembly 22 in a raw state.

Subsequently, the raw ceramic element assembly 22 is fired. The firing temperature depends on a ceramic material included in the ceramic green sheets or a metal material included in conductive paste films. However, for example, the firing temperature is preferably in the range of about 900° C. to about 1300° C.

After that, a polishing process by barreling, or other suitable method, is performed as required to planarize the electrode exposed ends 40 and 41 of the internal electrodes 32 and 33 and the dummy exposed ends 43 and 45 of the dummy conductors 34 and 35. At the same time, the edges and corners of the ceramic element assembly 22 are rounded.

Then, a plating process is performed to form the base plating films so as to cover the exposed end distribution regions 48. At this time, any one of electrolytic plating and electroless plating may be used. However, electroless plating requires a preprocess using a catalyst to improve a plating deposition rate and is disadvantageous in that the process is relatively complicated. Thus, it is preferable to utilize electrolytic plating. In addition, to perform the plating, it is preferably to use barrel plating, for example.

Subsequently, one or more upper layer plating films are formed on each of the base plating films as required.

Figure 10:
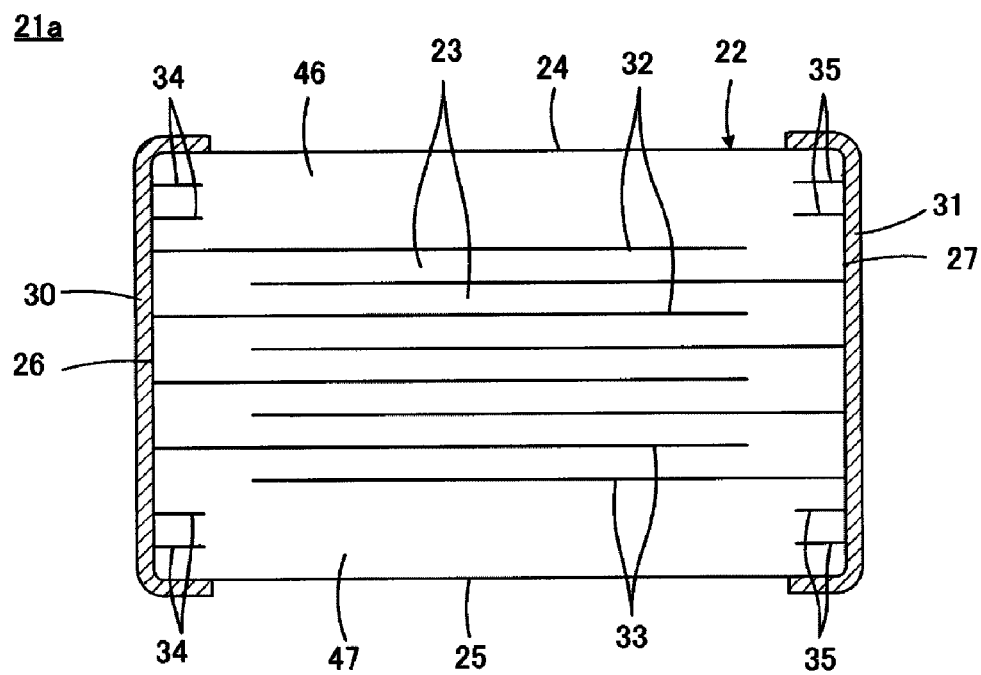
FIG. 10 is a view corresponding to FIG. 2 illustrating a second preferred embodiment of the present invention.

FIG. 10 is a view corresponding to FIG. 2 illustrating a second preferred embodiment of the present invention. In FIG. 10, the same reference numerals denote components corresponding to the components shown in FIG. 2, and the redundant description is omitted.

A monolithic ceramic electronic component 21a according to the second preferred embodiment includes the dummy conductors 34 and 35 that are provided only at the outer layer portions 46 and 47 of the ceramic element assembly 22.

Figure 11:
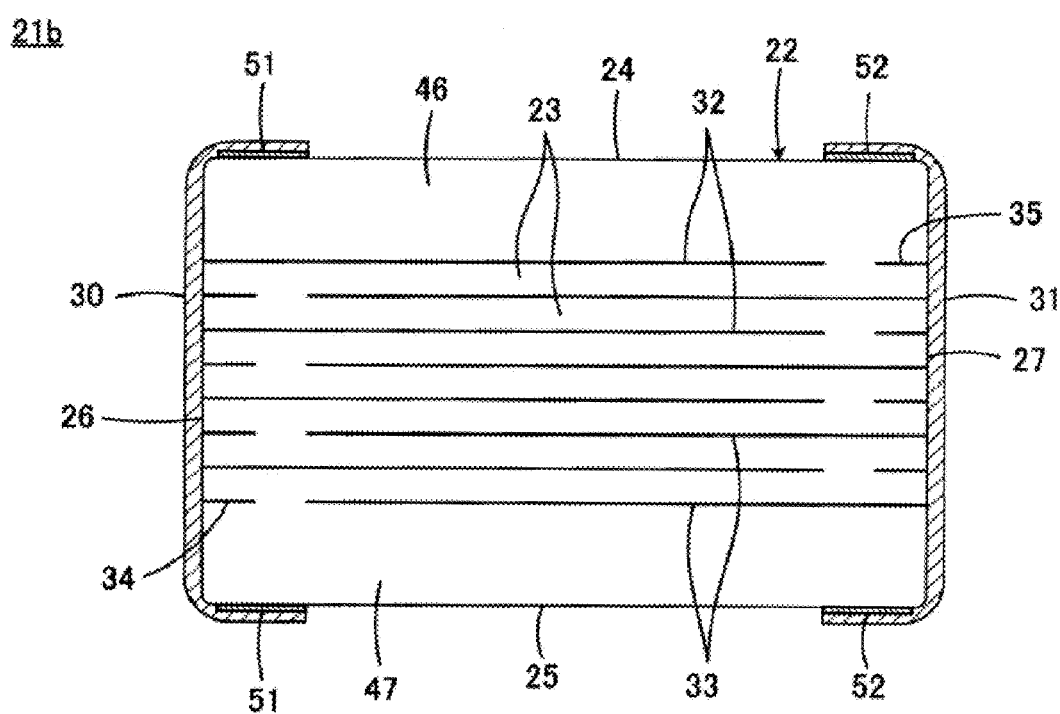
FIG. 11 is a view corresponding to FIG. 2 illustrating a third preferred embodiment of the present invention.

FIG. 11 is a view corresponding to FIG. 2 illustrating a third preferred embodiment of the present invention. In FIG. 11, the same reference numerals denote components corresponding to the components shown in FIG. 2, and the redundant description is omitted.

A monolithic ceramic electronic component 21b according to the third preferred embodiment include no dummy conductor provided at the outer layer portion 46 or 47 of the ceramic element assembly 22, and the dummy conductors 34 and 35 are provided only at portions arranged between the outer layer portions 46 and 47, that is, only at portions in which the internal electrodes 32 and 33 are arranged.

In the monolithic ceramic electronic component 21b according to the third preferred embodiment, no dummy conductor is provided at the outer layer portion 46 or 47 as described above. Instead, first and second auxiliary conductors 51 and 52 are provided on the first and second principal surfaces 24 and 25 of the ceramic element assembly 22 to thereby assist plating deposition of the base plating films included in the external terminal electrodes 30 and 31.

Figure 12A:
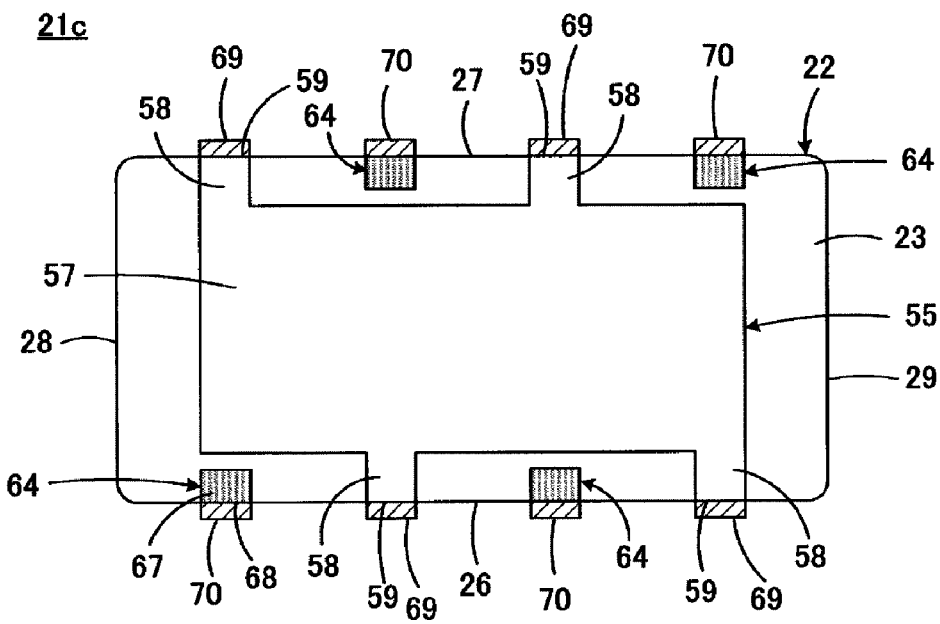
FIG. 12A and FIG. 12B are views corresponding to FIG. 3A to FIG. 3F illustrating a fourth preferred embodiment of the present invention.
Figure 12B:
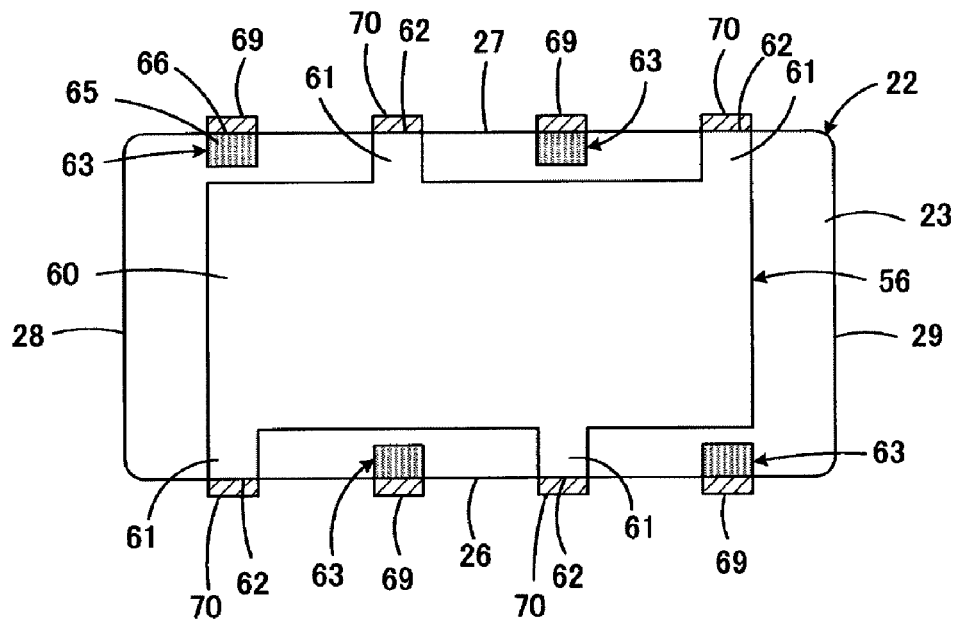

FIG. 12A and FIG. 12B are views corresponding to FIG. 3A to FIG. 3F illustrating a fourth preferred embodiment of the present invention, and FIG. 12A and FIG. 12B also show external terminal electrodes. In FIG. 12A and FIG. 12B, the reference numerals denote components corresponding to the components shown in FIG. 3A to FIG. 3F, and the redundant description is omitted.

A monolithic ceramic electronic component 21c according to a fourth preferred embodiment may preferably be used as a multiterminal low ESL monolithic ceramic capacitor, for example. The monolithic ceramic electronic component 21c has a similar external view as that of the monolithic ceramic electronic component 21 shown in FIG. 1.

Inside the ceramic element assembly 22, a plurality of pairs of first and second internal electrodes 55 and 56 with a predetermined ceramic layer 23 disposed therebetween are alternately arranged in the laminated direction.

As shown in FIG. 12A, each first internal electrode 55 includes a first effective portion 57 and a plurality of first extended portions 58 that extend from the first effective portion 57 to each of the first and second side surfaces 26 and 27, and first electrode exposed ends 59 are preferably arranged at terminal ends of the respective first extended portions 58 and exposed on the first or second side surface 26 or 27.

As shown in FIG. 12B, each second internal electrode 56 includes a second effective portion 60 opposite to the first effective portion 57 and a plurality of second extended portions 61 that extend from the second effective portion 60 to each of the first and second side surfaces 26 and 27, and second electrode exposed ends 62 are arranged at terminal ends of the respective second extended portions 61 and exposed on the first or second side surface 26 or 27.

In addition, as shown in FIG. 12B, first dummy conductors 63 are electrically insulated from the second internal electrode 56 and arranged substantially in the same plane as the second internal electrode 56. As shown in FIG. 12A, second dummy conductors 64 are electrically insulated from the first internal electrode 55 and arranged substantially in the same plane as the first internal electrode 55.

Each first dummy conductor 63 includes a first dummy body portion 65 and a first dummy exposed end 66 that is arranged at a terminal end of the first dummy body portion 65 and exposed at the first or second side surface 26 or 27. Each second dummy conductor 64 includes a second dummy body portion 67 and a second dummy exposed end 68 that is arranged at a terminal end of the second dummy body portion 67 and exposed at the first or second side surface 26 or 27.

When projecting the ceramic element assembly 22 in a direction in which the ceramic layers 23 are laminated, the first extended portions 58 and the first dummy body portions 65 are preferably arranged so as to overlap each other, and the second extended portions 61 and the second dummy body portions 67 are preferably arranged so as to overlap each other.

Thus, the first electrode exposed ends 59 and the first dummy exposed ends 66 define first exposed end distribution regions that extend in a plurality of lines in the direction in which the ceramic layers 23 are laminated, on each of the first and second side surfaces 26 and 27, and the second electrode exposed ends 62 and the second dummy exposed ends 68 define second exposed end distribution regions that extend in a plurality of lines in the direction in which the ceramic layers 23 are laminated, on each of the first and second side surfaces 26 and 27.

These first exposed end distribution regions and second exposed end distribution regions are alternately arranged on each of the first and second side surfaces 26 and 27. Each first exposed end distribution region is covered with a first external terminal electrode 69. Thus, the first electrode exposed ends 59 and the first dummy exposed ends 66 are electrically connected to the first external terminal electrode 69. On the other hand, each second exposed end distribution region is covered with a second external terminal electrode 70. Thus, the second electrode exposed ends 62 and the second dummy exposed ends 66 are electrically connected to the second external terminal electrode 70.

In addition, in the monolithic ceramic electronic component 21c, the first external terminal electrodes 69 and the second external terminal electrodes 70 are alternately arranged on each of the first and second side surfaces 26 and 27.

Figure 13A:
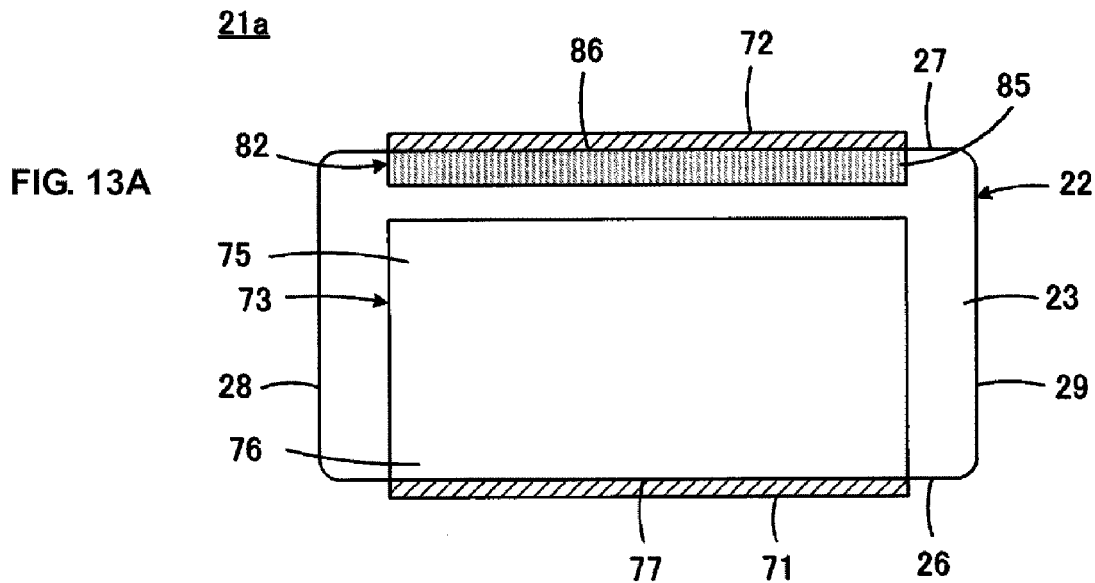
FIG. 13A and FIG. 13B are views corresponding to FIG. 3A to FIG. 3F illustrating a fifth preferred embodiment of the present invention.
Figure 13B:
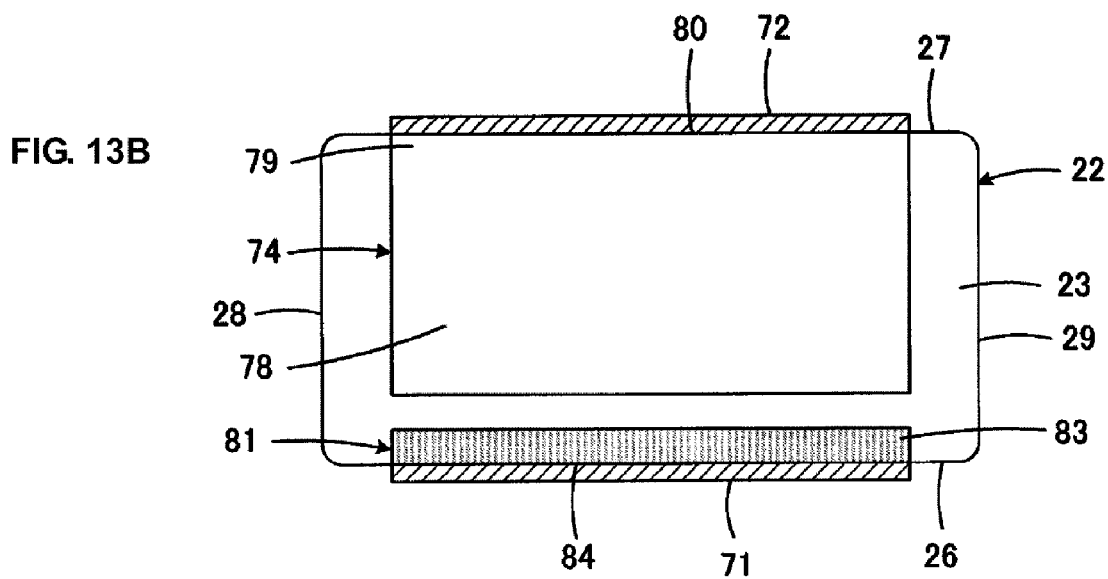

FIG. 13A and FIG. 13B are views corresponding to FIG. 3A to FIG. 3F illustrating a fifth preferred embodiment of the present invention, and FIG. 13A and FIG. 13B also show external terminal electrodes. In FIG. 13A and FIG. 13B, the reference numerals denote components corresponding to the components shown in FIG. 3A to FIG. 3F, and the redundant description is omitted.

A monolithic ceramic electronic component 21d according to the fifth preferred embodiment includes first and second external terminal electrodes 71 and 72 respectively provided one by one on the first and second side surfaces 26 and 27 having longer size in the width direction, and is a so-called LW reverse-type as compared to a general monolithic ceramic capacitor. The monolithic ceramic electronic component 21d may preferably be used as a low ESL monolithic ceramic capacitor.

Inside the ceramic element assembly 22, a plurality of pairs of first and second internal electrodes 73 and 74 with a predetermined ceramic layer 23 disposed therebetween are alternately arranged in the laminated direction.

As shown in FIG. 13A, each first internal electrode 73 includes a first effective portion 75 and a first extended portion 76 that extends from the first effective portion 75 to the first side surface 26, and a first electrode exposed end 77 is arranged at a terminal end of the first extended portion 76 and exposed at the first side surface 26.

As shown in FIG. 13B, each second internal electrode 74 includes a second effective portion 78 opposite to the first effective portion 75 and a second extended portion 79 that extends from the second effective portion 78 to the second side surface 27, and a second electrode exposed end 80 is arranged at a terminal end of the second extended portion 79 and exposed at the second side surface 27.

In addition, as shown in FIG. 13B, a first dummy conductor 81 is electrically insulated from the second internal electrode 74 and preferably arranged substantially in the same plane as the second internal electrode 74. As shown in FIG. 13A, a second dummy conductor 82 is electrically insulated from the first internal electrode 73 and preferably arranged substantially in the same plane as the first internal electrode 73.

The first dummy conductor 81 includes a first dummy body portion 83 and a first dummy exposed end 84 that is arranged at a terminal end of the first dummy body portion 83 and exposed at the first side surface 26. The second dummy conductor 82 includes a second dummy body portion 85 and a second dummy exposed end 86 that is arranged at a terminal end of the second dummy body portion 85 and exposed at the second side surface 27.

When projecting the ceramic element assembly 22 in a direction in which the ceramic layers 23 are laminated, the first extended portions 76 and the first dummy body portions 83 are preferably arranged so as to overlap each other, and the second extended portions 79 and the second dummy body portions 85 are preferably arranged so as to overlap each other.

Thus, the first electrode exposed ends 77 and the first dummy exposed ends 84 define a first exposed end distribution region that extends in a line in the direction in which the ceramic layers 23 are laminated, on the first side surface 26, and the second electrode exposed ends 80 and the second dummy exposed ends 86 define a second exposed end distribution region that extends in a line in the direction in which the ceramic layers 23 are laminated, on the second side surface 27.

The first external terminal electrode 71 is preferably arranged to cover the first exposed end distribution region. Thus, the first electrode exposed ends 77 and the first dummy exposed ends 84 are electrically connected to the first external terminal electrode 71. On the other hand, the second external terminal electrode 72 is preferably arranged to cover the second exposed end distribution region. Thus, the second electrode exposed ends 80 and the second dummy exposed ends 86 are electrically connected to the second external terminal electrode 72.

Figure 14A:
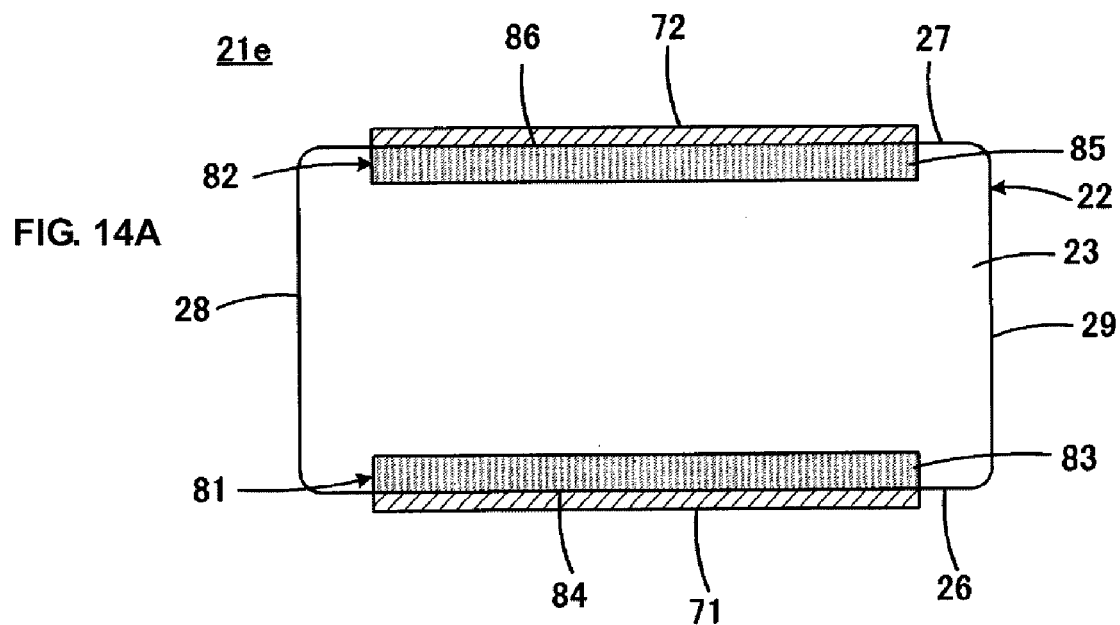
FIG. 14A and FIG. 14B are views corresponding to FIG. 13A and FIG. 13B illustrating a sixth preferred embodiment of the present invention.
Figure 14B:
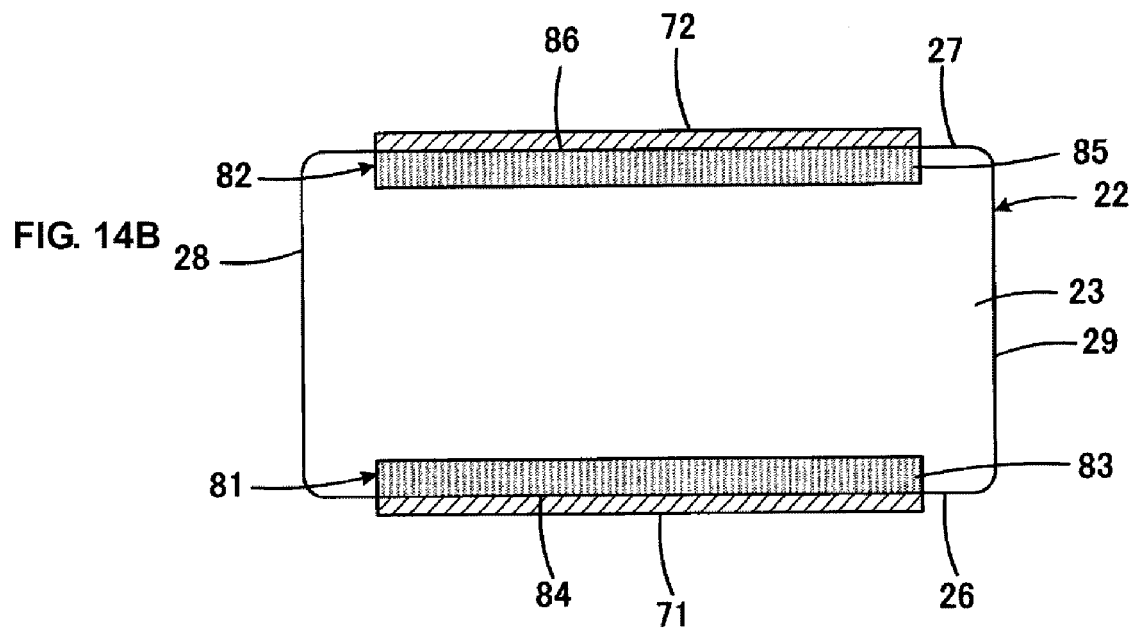

FIG. 14A and FIG. 14B are views corresponding to FIG. 13A and FIG. 13B illustrating a sixth preferred embodiment of the present invention. In FIG. 14A and FIG. 14B, the same reference numerals denote components corresponding to the components shown in FIG. 13A and FIG. 13B, and the redundant description is omitted.

A monolithic ceramic electronic component 21e according to the sixth preferred embodiment shown in FIG. 14A and FIG. 14B is an alternative preferred embodiment to the monolithic ceramic electronic component 21d according to the fifth preferred embodiment shown in FIG. 13A and FIG. 13B, and includes first and second dummy conductors 81 and 82 that are provided at the outer layer portions, in which no internal electrode is provided, in the ceramic element assembly 22. FIG. 14A shows the ceramic layer 23 located at one of the outer layer portions. FIG. 14B shows the ceramic layer 23 located at another outer layer portion.

FIG. 15A to FIG. 15D are views corresponding to FIG. 3A to FIG. 3F illustrating a seventh preferred embodiment of the present invention, and FIG. 15A to FIG. 15D also show external terminal electrodes. In FIG. 15A to FIG. 15D, the same reference numerals denote components corresponding to the components shown in FIG. 3A to FIG. 3F, and the redundant description is omitted.

In a monolithic ceramic electronic component 21f, a first external terminal electrode 91 is preferably configured so as to have a substantially U shape extending from the third side surface 28 to portions of the respective first and second side surfaces 26 and 27, and a second external terminal electrode 92 is preferably configured so as to have a substantially U shape extending from the fourth side surface 29 to portions of the respective first and second side surfaces 26 and 27.

Figure 15A:
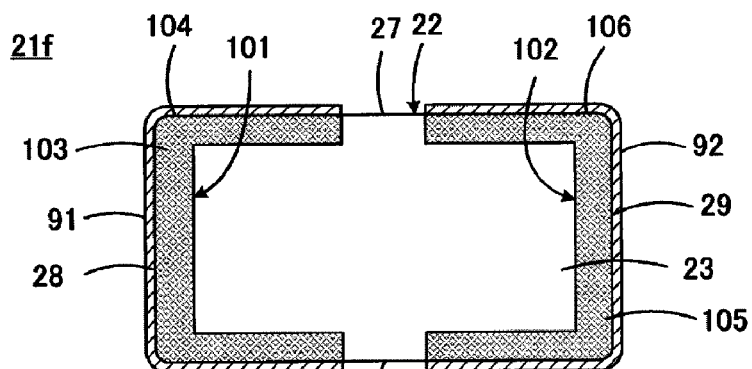
FIG. 15A to FIG. 15D are views corresponding to FIG. 3A to FIG. 3F illustrating a seventh preferred embodiment of the present invention.
Figure 15B:
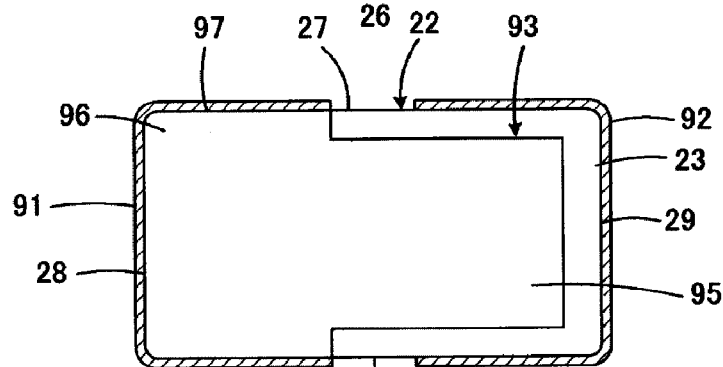
Figure 15C:
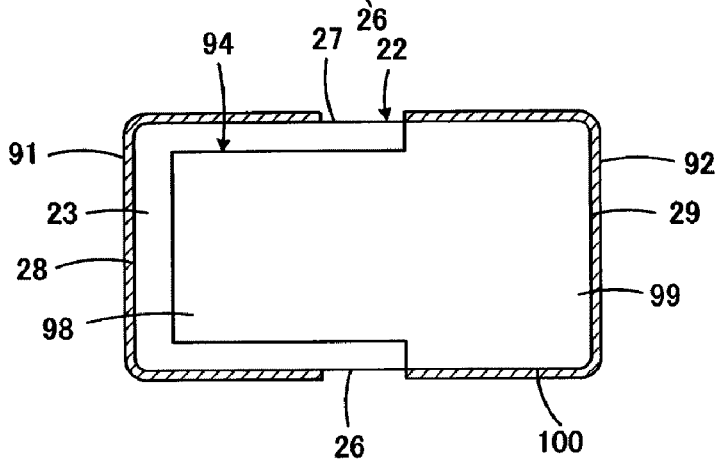

As shown in FIG. 15B and FIG. 15C, inside the ceramic element assembly 22, a plurality of pairs of first and second internal electrodes 93 and 94 with a predetermined ceramic layer 23 disposed therebetween are alternately arranged in the laminated direction.

As shown in FIG. 15B, the first internal electrode 93 includes a first effective portion 95 and a first extended portion 96 that extends from the first effective portion 95 to the third side surface 28 and portions of the respective first and second side surfaces 26 and 27, and a first electrode exposed end 97 is arranged at a terminal end of the first extended portion 96 and exposed at the third side surface 28 and the portions of the respective first and second side surfaces 26 and 27. In this manner, the first internal electrode 93 has a substantially T shape in plan view, and the first extended portion 96 and the first electrode exposed end 97 extend in a substantially U shape.

As shown in FIG. 15C, the second internal electrode 94 includes a second effective portion 98 and a second extended portion 99 that extends from the second effective portion 98 to the fourth side surface 29 and portions of the respective first and second side surfaces 26 and 27, and a second electrode exposed end 100 is arranged at a terminal end of the second extended portion 99 and exposed at the fourth side surface 29 and the portions of the respective first and second side surfaces 26 and 27. In this manner, the second internal electrode 94 also has a substantially T shape in plan view, and the second extended portion 99 and the second electrode exposed end 100 extend in a substantially U shape.

Figure 15D:
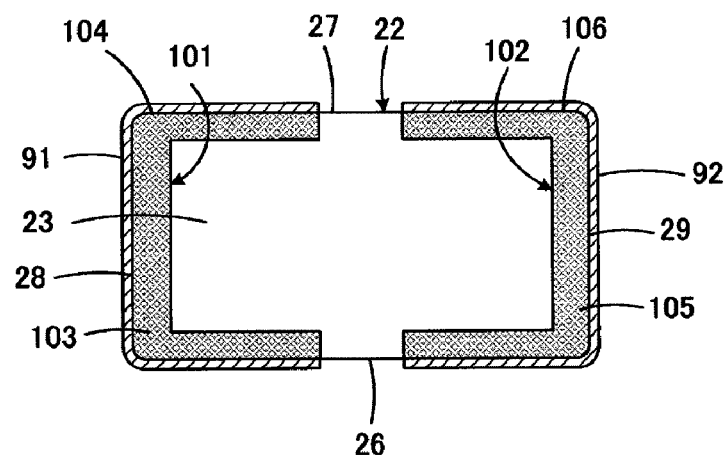
Figure 16:
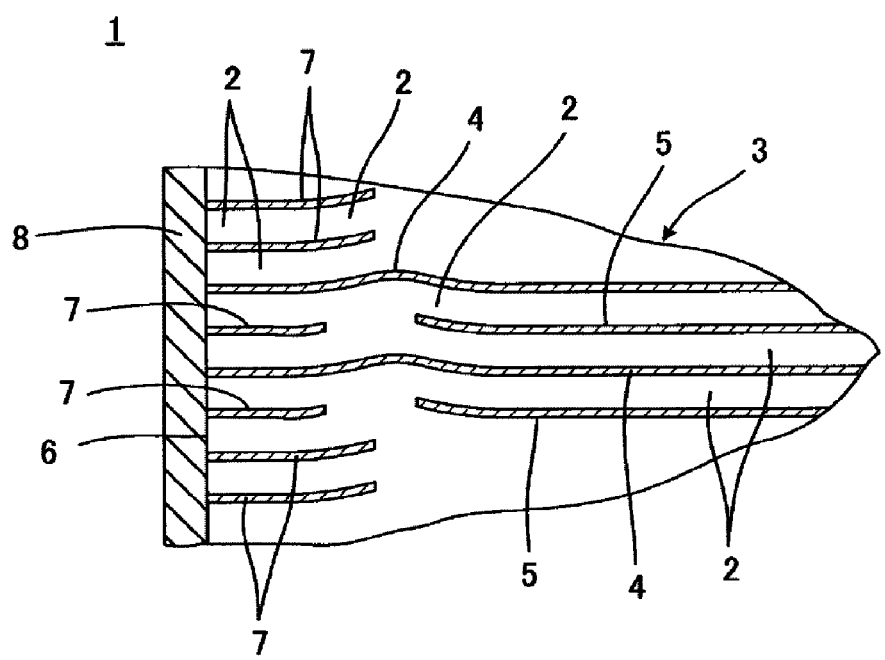
FIG. 16 illustrates a problem addressed by the preferred embodiments of the present invention and is a partially enlarged cross-sectional view of a monolithic ceramic electronic component that has an undesirable deformation due to a swell (waviness) formed when a mother block is stamped.
Figure 17:
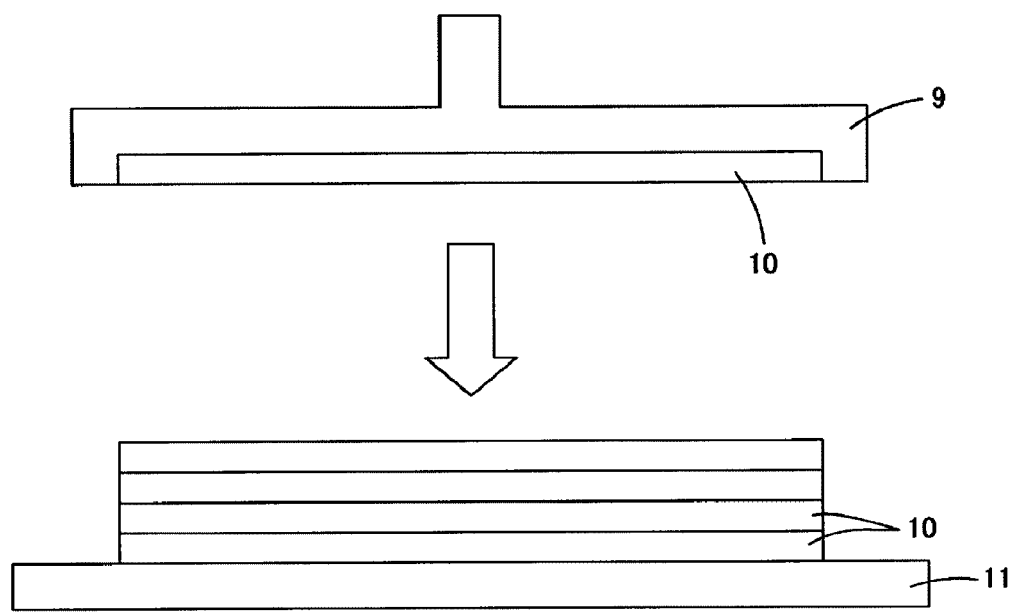
FIG. 17 illustrates a problem addressed by the preferred embodiments of the present invention and is a cross-sectional view that illustrates a process of laminating and sequentially pressure-bonding ceramic green sheets.
Figure 18:
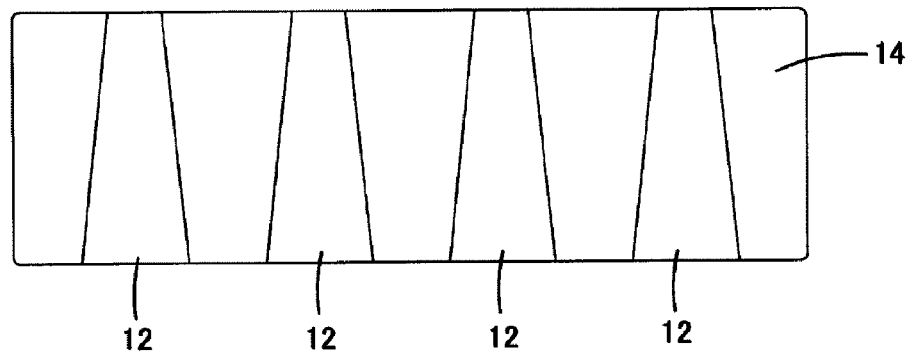
FIG. 18 illustrates a problem addressed by the preferred embodiments of the present invention and is a view showing a state in which external terminal electrodes that should be strip-shaped in a plurality of lines on a side surface of a ceramic element assembly undesirably have a substantially trapezoidal shape.

As shown in FIG. 15A and FIG. 15D, first and second dummy conductors 101 and 102 are provided at the outer layer portions in which no internal electrode 93 or 94 is provided in the ceramic element assembly 22.

The first dummy conductor 101 preferably extends in a substantially U shape, and includes a first dummy body portion 103 and a first dummy exposed end 104 that is arranged at a terminal end of the first dummy body portion 103 and exposed at the third side surface 28 and the portions of the respective first and second side surfaces 26 and 27. The second dummy conductor 102 includes a second dummy body portion 105 and a second dummy exposed end 106 that is arranged at a terminal end of the second dummy body portion 105 and exposed on the fourth side surface 29 and the portions of the respective first and second side surfaces 26 and 27.

When projecting the ceramic element assembly 22 in a direction in which the ceramic layers 23 are laminated, the first extended portions 96 and the first dummy body portions 103 are preferably arranged so as to overlap each other, and the second extended portions 99 and the second dummy body portions 105 are preferably arranged so as to overlap each other.

Thus, the first electrode exposed ends 97 and the first dummy exposed ends 104 define a first exposed end distribution region that extends in a line in the direction in which the ceramic layers 23 are layered, on the third side surface 28 and portions of the respective first and second side surfaces 26 and 27, and the second electrode exposed ends 100 and the second dummy exposed ends 106 define a second exposed end distribution region that extends in a line in the direction in which the ceramic layers 23 are laminated, on the fourth side surface 29 and portions of the respective first and second side surfaces 26 and 27.

The first external terminal electrode 91 is preferably arranged to cover the first exposed end distribution region. Thus, the first electrode exposed ends 97 and the first dummy exposed ends 104 are electrically connected to the first external terminal electrode 91. On the other hand, the second external terminal electrode 92 is preferably arranged to cover the second exposed end distribution region. Thus, the second electrode exposed ends 100 and the second dummy exposed ends 106 are electrically connected to the second external terminal electrode 92.

The monolithic ceramic electronic component 21f is preferably mounted on a mounting substrate so that the internal electrodes 93 and 94 are perpendicular or substantially perpendicular to the mounting substrate, that is, the third or fourth side surface 28 or 29 is preferably used as a mounting-side surface.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A monolithic ceramic electronic component comprising:
   a ceramic element assembly including a plurality of laminated ceramic layers, a first principal surface and a second principal surface that are opposite to each other, and a plurality of side surfaces connecting the first principal surface with the second principal surface;
   a first internal electrode provided inside the ceramic element assembly and including a first effective portion, a first extended portion extending from the first effective portion to at least one of the plurality of side surfaces, and a first electrode exposed end arranged at a terminal end of the first extended portion and exposed at the at least one of the plurality of side surfaces;
   a second internal electrode provided inside the ceramic element assembly and including a second effective portion opposite to the first effective portion through one of the plurality of ceramic layers, a second extended portion extending from the second effective portion to at least one of the plurality of side surfaces, and a second electrode exposed end arranged at a terminal end of the second extended portion and exposed at the at least one of the plurality of side surfaces;
   a first dummy conductor provided inside the ceramic element assembly and including a first dummy body portion and a first dummy exposed end arranged at a terminal end of the first dummy body portion and exposed at least one of the plurality of side surfaces, wherein the first dummy conductor is electrically insulated from the second internal electrode;
   a second dummy conductor provided inside the ceramic element assembly and including a second dummy body portion and a second dummy exposed end arranged at a terminal end of the second dummy body portion and exposed at at least one of the plurality of side surfaces, wherein the second dummy conductor is electrically insulated from the first internal electrode;
   a first external terminal electrode provided on at least one of the plurality of side surfaces of the ceramic element assembly; and
   a second external terminal electrode provided on at least one of the plurality of side surfaces of the ceramic element assembly; wherein
   the first electrode exposed end and the first dummy exposed end define a first exposed end distribution region that extends in at least one line in a direction in which the plurality of ceramic layers are laminated, on at least one of the plurality of side surfaces;
   the second electrode exposed end and the second dummy exposed end define a second exposed end distribution region that extends in at least one line in the direction in which the plurality of ceramic layers are laminated, on at least one of the plurality of side surfaces;
   the first external terminal electrode is arranged so as to cover the first exposed end distribution region;
   the second external terminal electrode is arranged so as to cover the second exposed end distribution region;
   a conductor density of the first dummy body portion is less than a conductor density of the first extended portion; and
   a conductor density of the second dummy body portion is less than a conductor density of the second extended portion.

2. The monolithic ceramic electronic component according to claim 1, wherein
   the first external terminal electrode includes a first base plating film that is arranged to cover the first exposed end distribution region; and
   the second external terminal electrode includes a second base plating film that is arranged to cover the second exposed end distribution region.

3. The monolithic ceramic electronic component according to claim 1, wherein
   the first dummy conductor is arranged in substantially the same plane as the second internal electrode; and
   the second dummy conductor is arranged in substantially the same plane as the first internal electrode.

4. The monolithic ceramic electronic component according to claim 1, wherein the first dummy conductor and the second dummy conductor are arranged in substantially the same plane.

5. The monolithic ceramic electronic component according to claim 1, wherein
the ceramic element assembly includes outer layer portions respectively at a side adjacent to the first principal surface and at a side adjacent to the second principal surface;
neither the first internal electrode nor the second internal electrode is provided in the outer layer portions; and
the first dummy conductor and the second dummy conductor are provided at the outer layer portions.

6. The monolithic ceramic electronic component according to claim 1, wherein
the plurality of side surfaces include a first side surface and a second side surface that are opposite to each other;
the first exposed end distribution region is arranged on the first side surface; and
the second exposed end distribution region is arranged on the second side surface.

7. The monolithic ceramic electronic component according to claim 1, wherein
the plurality of side surfaces include a first side surface and a second side surface opposite to each other and a third side surface and a fourth side surface opposite to each other;
the first exposed end distribution region is arranged on the first side surface, the third side surface and the fourth side surface; and
the second exposed end distribution region is arranged on the second side surface, the third side surface and the fourth side surface.

8. The monolithic ceramic electronic component according to claim 1, wherein
a plurality of lines of the first exposed end distribution regions are arranged on at least one of the plurality of side surfaces in a width direction of the at least one of the plurality of side surfaces; and
a plurality of lines of the second exposed end distribution regions are arranged on at least one of the plurality of side surfaces in a width direction of the at least one of the plurality of side surfaces.

9. The monolithic ceramic electronic component according to claim 1, wherein a plurality of spaced apart linear conductors are arranged to extend in the first dummy body portion and the second dummy body portion.

10. The monolithic ceramic electronic component according to claim 1, wherein a reticular conductor is provided in the first dummy body portion and in the second dummy body portion.

* * * * *